US009113373B2

(12) United States Patent
Hillan

(10) Patent No.: US 9,113,373 B2
(45) Date of Patent: Aug. 18, 2015

(54) METHODS AND APPARATUS FOR IMPROVING PEER COMMUNICATIONS USING AN ACTIVE COMMUNICATION MODE

(75) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 13/486,741

(22) Filed: Jun. 1, 2012

(65) Prior Publication Data

US 2013/0267167 A1    Oct. 10, 2013

Related U.S. Application Data

(60) Provisional application No. 61/622,292, filed on Apr. 10, 2012.

(51) Int. Cl.
*H04B 5/00* (2006.01)
*H04B 7/00* (2006.01)
*H04W 28/22* (2009.01)

(52) U.S. Cl.
CPC .................................... *H04W 28/22* (2013.01)

(58) Field of Classification Search
CPC . G06K 7/10297; H04B 5/0031; H04W 28/18; H04W 48/16; H04W 4/008; H04W 72/04; H04W 84/10; H04W 8/005
USPC ........................................ 455/41.2, 41.3, 41.1
See application file for complete search history.

(56) References Cited

U.S. PATENT DOCUMENTS

| 6,134,220 | A | 10/2000 | Le Strat et al. |
| 6,424,636 | B1 | 7/2002 | Seazholtz et al. |
| 7,346,061 | B2 | 3/2008 | Takayama et al. |
| 2012/0045989 | A1* | 2/2012 | Suumaki et al. ............. 455/41.1 |
| 2012/0076026 | A1 | 3/2012 | Ballas |
| 2012/0329393 | A1* | 12/2012 | Hillan et al. ................. 455/41.1 |
| 2013/0102247 | A1* | 4/2013 | Hillan et al. ................. 455/41.1 |

FOREIGN PATENT DOCUMENTS

WO    WO2007141100 A1    12/2007

OTHER PUBLICATIONS

Technical Specification Near Field Communication (NFC) IP-1; Interface and Protocol (NFCIP-1), ETSI TS 102 190 V1.1.1 (Mar. 2003), pp. 12,13,25,26 and 48-50.*

(Continued)

*Primary Examiner* — Lewis West
(74) *Attorney, Agent, or Firm* — Charles E. Eggers

(57) ABSTRACT

Aspects disclosed herein relate to enabling specification of different bit rates in each direction for NFC peer communications. In one example, a target NFC device may be configured to receive a parameter selection request including a first bit rate value to be used for transmissions from an initiator NFC device to the target NFC device and a second bit rate value to be used in the other direction, and to function in either a first or a second target sub-state based on the first bit rate value. In another example, an initiator NFC device may be configured to determine a first bit rate value to be used for transmissions from an initiator NFC device to a target NFC device and a second bit rate value to be used in the other direction, and to transmit the first and second bit rate values in a parameter selection request message.

40 Claims, 9 Drawing Sheets

(56) References Cited

OTHER PUBLICATIONS

NFC Activity Specification. Technical Specification. NFC Forum TM. Activity 1.0. NFCForum-TS-Activity-1.0. 10 pages. Nov. 11, 2018.

"Information technology Telecommunications and information exchange between systems Near Field Communication Interface and Protocol (NFCIP-1)", Technologies de l'information Telecommunications et e'change d'information entire systemes Communication de champ proche Interface et 37-42, protocole (NFCIP-1), International Standard ISO/IEC, XX, XX, vol. 18092, No. 1st edition, Apr. 1, 2004, p. 66PP, XP007905654, pp. 6-12, pp. 34-36.

International Search Report and Written Opinion—PCT/US2013/035657—ISA/EPO—Jul. 16, 2013.

"Near Field Communication (NFC) IP-1; Interface and Protocol (NFCIP-1); ETSI TS 102 190", IEEE, LIS, Sophia Antipolis Cedex, France, vol. ECMATC32, No. V1.1.1, Mar. 1, 2003.

"NFC Forum Device Requirements, High Level Conformance Requirements Revision V1.0", Jan. 26, 2010, XP055065535, Retrieved from the Internet: URL:http://certification.nfc-forum.org/docs/NFC Forum Device Requirements.pdf, pp. 8, 9, 14-16, 18, 19.

Taiwan Search Report—TW102112725—TIPO—Feb. 5, 2015.

\* cited by examiner

METHODS AND APPARATUS FOR IMPROVING PEER COMMUNICATIONS USING AN ACTIVE COMMUNICATION MODE

CLAIM OF PRIORITY UNDER 35 U.S.C. §119

The present Application for patent claims priority to Provisional Application No. 61/622,292 entitled "METHODS AND APPARATUS FOR IMPROVING PEER COMMUNICATIONS USING AN ACTIVE COMMUNICATION MODE" filed Apr. 10, 2012, and assigned to the assignee hereof and hereby expressly incorporated by reference herein.

BACKGROUND

The disclosed aspects relate generally to communications between and/or within devices and specifically to methods and systems for improving peer communications through allowing use of different bit rates from a target near field communication (NFC) device and an initiator NFC device and from a initiator NFC device to a target NFC device.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

NFC enabled devices may operation in a polling mode and/or a listening mode. As part of a device activation activity process associated with peer mode communications, an initiator NFC device may specify a bit rate. Version 1.0 of the NFC Forum Activity specification only includes a single parameter for configuring the bit rate to be used in peer mode. As such, currently there is no way to configure a device to use different bit rates for each direction.

Thus, improved apparatuses and methods for providing a mechanism to enable specification of different bit rates in each direction for peer communications may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with enabling specification of different bit rates in each direction for peer communications. In one example, a target NFC device may be configured to receive a parameter selection request including a first bit rate value to be used for transmissions from an initiator NFC device to the target NFC device and a second bit rate value to be used in the other direction. The target NFC device may be also configured to function in either a first or a second target sub-state based on the first bit rate value. In another example, an initiator NFC device may be configured to determine a first bit rate value to be used for transmissions from an initiator NFC device to a target NFC device and a second bit rate value to be used in the other direction. The initiator NFC device may also be configured to transmit the first bit rate value and the second bit rate value to the target NFC device in a parameter selection request message.

According to related aspects, a method for enabling specification of different bit rates in each direction for peer communications is described. The method can include receiving, by a target NFC device, a parameter selection request including a first bit rate value to be used for transmissions from an initiator NFC device to the target NFC device and a second bit rate value to be used for transmissions from the target NFC device to the initiator NFC device. The method can also include functioning in either a first target sub-state or a second target sub-state based on the first bit rate value.

Another aspect relates to a communications apparatus. The communications apparatus can include means for receiving, by a target NFC device, a parameter selection request including a first bit rate value to be used for transmissions from an initiator NFC device to the target NFC device and a second bit rate value to be used for transmissions from the target NFC device to the initiator NFC device. The communications apparatus can also include means for functioning in either a first target sub-state or a second target sub-state based on the first bit rate value.

Another aspect relates to a communications apparatus. The apparatus can include a NFC peer mode communications module configured to receive a parameter selection request including a first bit rate value to be used for transmissions from an initiator NFC device to the target NFC device and a second bit rate value to be used for transmissions from the target NFC device to the initiator NFC device. The NFC peer mode communications module may be further configured to function in either a first target sub-state or a second target sub-state based on the first bit rate value.

Another aspect relates to a computer program product, which can have a computer-readable medium comprising code for receiving, by a target NFC device, a parameter selection request including a first bit rate value to be used for transmissions from an initiator NFC device to the target NFC device and a second bit rate value to be used for transmissions from the target NFC device to the initiator NFC device. The computer-readable medium can also include code for functioning in either a first target sub-state or a second target sub-state based on the first bit rate value.

According to related aspects, another method for enabling specification of different bit rates in each direction for peer communications is described. The method can include determining, by an initiator NFC device, a first bit rate value to be used for transmissions from the initiator NFC device to a target NFC device and a second bit rate value to be used for transmissions from the target NFC device to the initiator NFC device. The method can also include transmitting the first bit rate value and the second bit rate value to the target NFC device in a parameter selection request message.

Another aspect relates to a communications apparatus. The communications apparatus can include means for determining, by an initiator NFC device, a first bit rate value to be used for transmissions from the initiator NFC device to a target NFC device and a second bit rate value to be used for transmissions from the target NFC device to the initiator NFC device. The communications apparatus can also include means for transmitting the first bit rate value and the second bit rate value to the target NFC device in a parameter selection request message.

Another aspect relates to a communications apparatus. The apparatus can include a NFC peer mode communications module configured to determine a first bit rate value to be used for transmissions from the initiator NFC device to a target NFC device and a second bit rate value to be used for transmissions from the target NFC device to the initiator NFC device. The NFC peer mode communications module may be further configured transmit the first bit rate value and the second bit rate value to the target NFC device in a parameter selection request message.

Another aspect relates to a computer program product, which can have a computer-readable medium comprising code for determining, by an initiator NFC device, a first bit rate value to be used for transmissions from the initiator NFC device to a target NFC device and a second bit rate value to be used for transmissions from the target NFC device to the initiator NFC device. The computer-readable medium can also include code for transmitting the first bit rate value and the second bit rate value to the target NFC device in a parameter selection request message.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link. As described herein, an initiator NFC device may be configured to indicate to a target NFC device that different bit rates may be used in each direction for NFC peer mode communications.

Figure 1:
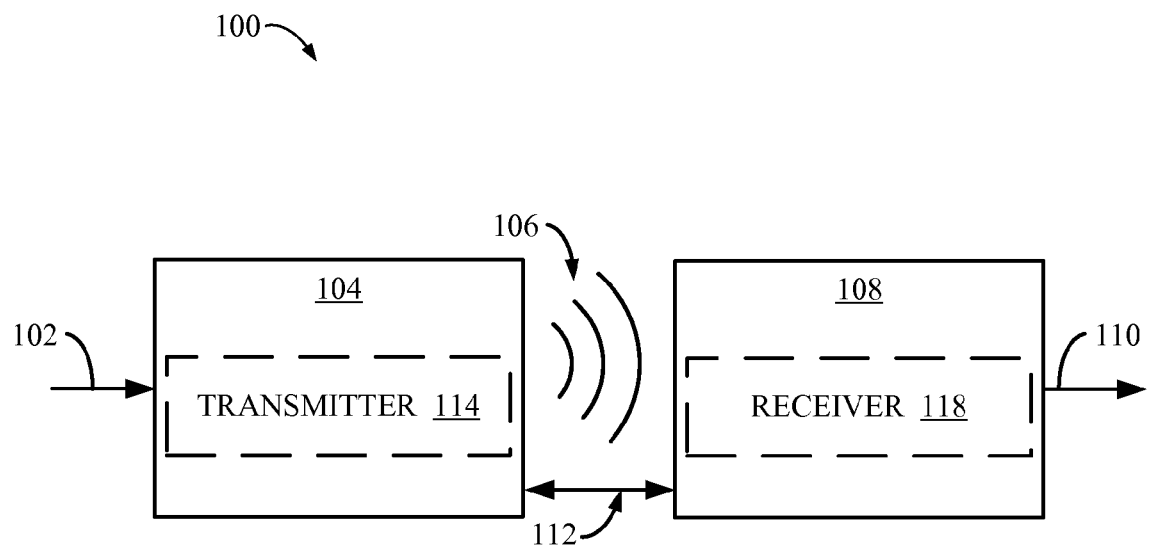
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
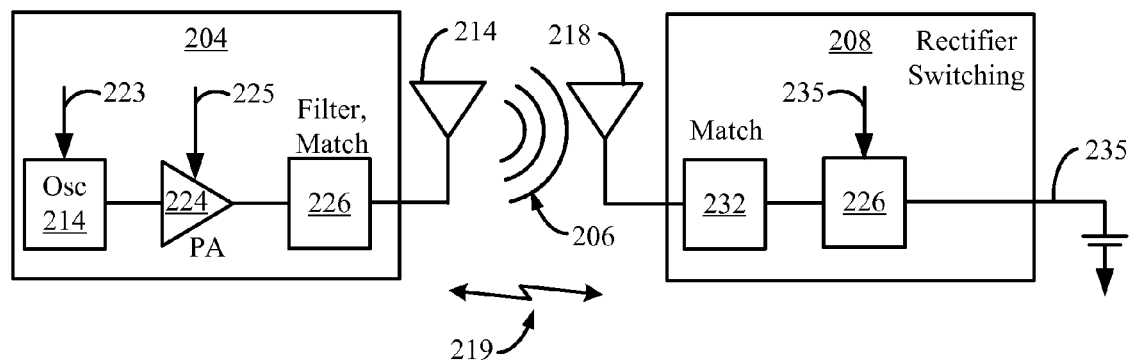
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 119 (e.g., Bluetooth, zigbee, cellular, etc).

Figure 3:
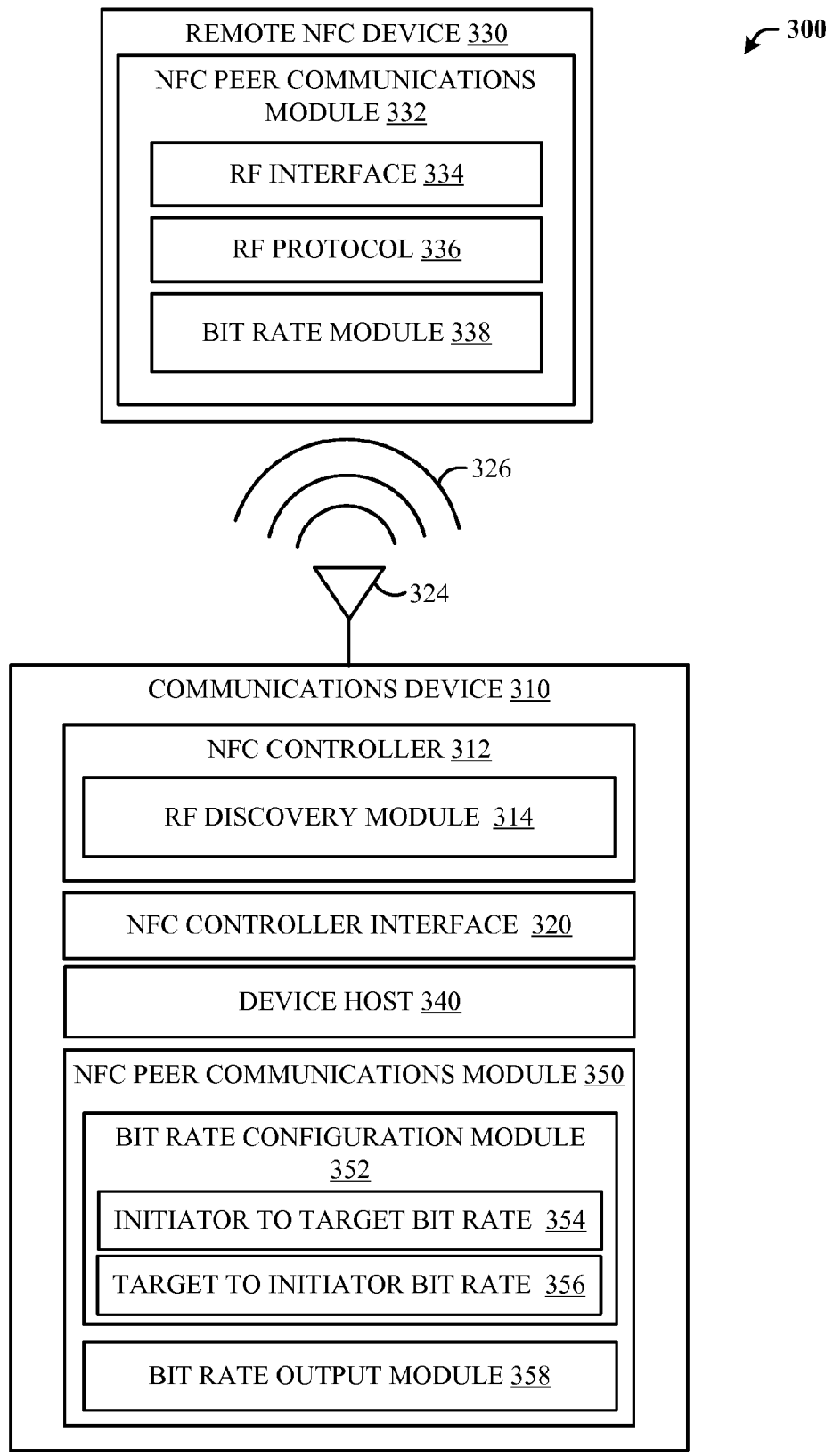
FIG. 3 is a block diagram of a NFC environment, according to an aspect.

With reference to FIG. 3, a block diagram of a communication network 300 according to an aspect is illustrated. Communication network 300 may include communications device 310 which, through antenna 324, may be in communication with a remote NFC device 330 using one or more NFC technologies 326 (e.g., NFC-A, NFC-B, NFC-F, etc.). In an aspect, remote NFC device 330 and/or communications device 310 may be operable to communicate through NFC peer mode communications module 332 through one or more RF interfaces 334 using one or more RF protocols 336. Further, NFC peer mode communications module 332 may include bit rate module 338 that is operable to determine a bit rate for use for communications from communications device 310 and for communications to communications device 310. In an aspect, bit rate module 338 may be provided with different bit rates values for use in each direction for NFC peer mode communications. In another aspect, communications device 310 may be operable to be connected to an access network and/or core network (e.g., a CDMA network, a GPRS network, a UMTS network, and other types of wireline and wireless communication networks). In an aspect, remote NFC device 330 may include but is not limited to a remote NFC tag, a reader/writer device, a peer initiator device, a remote peer target device, etc.

Communications device 310 may include NCI 320. In an aspect, NCI 320 may be operable to enable communications between a NFC enabled antenna and NFC controller 312. NCI 320 may be operable to function in a listening mode and/or a polling mode. During passive communication mode communications, whichever mode the communications device 310 begins peer communications as is the mode that the communications device 310 may remain for the duration of the peer communications. During active communication mode communications, communications device 310 may switch listening mode and polling mode responsibilities during a peer communications link.

Communications device 310 may include a NFC controller (NFCC) 312. In an aspect, NFCC 312 may include RF discovery module 314. RF discovery module 314 may be operable to perform RF discovery using a RF discovery loop as part of a discovery process to enable peer mode communications. DH 340 may be operable to generate a command to prompt NFCC 312 to perform various functions associated with RF discovery.

Communications device 310 may include NFC peer communications module 350. NFC peer communications module 350 may be operable to enable various modes and/or configurations for peer communications. In an aspect, NFC peer communications module 350 may include bit rate configuration module 352 that may be operable to configure peer mode communications in which different bit rates may be used in each direction. In an aspect, bit rate configuration module 352 may configure an initiator to target bit rate 354 and a target to initiator bit rate 356. In an aspect, the initiator to target bit rate 354 may be the same as the target to initiator bit rate 356. In another aspect, bit rate configuration module 352 may configure the target bit rate 354 and target to initiator bit rate 356 with a value that prompts communications device (e.g., 310, 330) to maintain a current (e.g., default bit rate). For example, where a communications device is in a ready state to support NFC-F RF technology based communications, a default value of 424 kilobits per second (kbps) may be used. In another aspect, bit rate configuration module 352 may configure the target bit rate 354 and target to initiator bit rate 356 with values that prompt communications device (e.g., 310, 330) to use one or a plurality of bit rate options. For example, the different bit rate options may include, but are not limited to, 106 kbps, 212, kbps, 424 kbps, etc. Table 1 provides example configure parameters used during device activation.

TABLE 1

Device Activation Activity - Configuration Parameters

| Name | Format | Size | Description |
|---|---|---|---|
| CON_ATR | Hexadecimal | 3 Bytes | ATR_REQ Command parameter Refer to [DIGITAL] (Byte 13 of ATR_REQ) for the coding of Byte 1. Refer to [DIGITAL] (Byte 14 of ATR_REQ) for the coding of Byte 2. Refer to [DIGITAL] (Byte 15 of ATR_REQ) for the coding of Byte 3. Refer to [DIGITAL] (Byte 16 of ATR_REQ) for the coding of Byte 4. |
| CON_GB | Hexadecimal | n Bytes | General bytes of the ATR_REQ or Higher Layer INF of ATTRIB Refer to [DIGITAL] Byte 17 + n of ATR_REQ and [DIGITAL] Byte 10 + n for ATTRIB. For the ATR_REQ, these bytes contain the General Bytes ($G_T0 \ldots G_Tn$) as information for LLCP. For ATTRIB, these bytes contain High Layer INF. |
| CON_RATS | Hexadecimal | 1 Byte | RATS Command Parameters Refer to [DIGITAL] (Byte 2 of RATS Command) for the coding of Byte 1. |

TABLE 1-continued

Device Activation Activity - Configuration Parameters

| Name | Format | Size | Description |
| --- | --- | --- | --- |
| CON_ATTRIB | hexadecimal | 3 Bytes | ATTRIB Command Parameters Refer to [DIGITAL] (Byte 6 of ATTRIB Command) for the coding of Byte 1. Refer to [DIGITAL] (Byte 7 of ATTRIB Command) for the coding of Byte 2. Refer to [DIGITAL] (Byte 8 of ATTRIB Command) for the coding of Byte 3. Refer to [DIGITAL] (Byte 9 of ATTRIB Command) for the coding of Byte 4. |
| CON_BITR_NFC_DEP_I2T | Integer | 1 Byte | Desired Bit rate for NFC-DEP in the direction from Initiator to Target<br>0: maintain the bit rate<br>1: 106 kbps<br>2: 212 kbps<br>3: 424 kbps |
| CON_BITR_NFC_DEP_T2I | Integer | 1 Byte | Desired Bit rate for NFC-DEP in the direction from Target to Initiator<br>0: maintain the bit rate<br>1: 106 kbps<br>2: 212 kbps<br>3: 424 kbps |

As seen in Table 1, different bit rates may be configured for each direction of communications. An initiator to target bit rate 354 may be indicated using the CON_BITR_NFC_DEP_I2T parameter and a target to initiator bit rate 346 may be indicated using the CON_BITR_NFC_DEP_T2I parameter.

NFC peer communications module 350 may use the initiator to target bit rate 354 and target to initiator bit rate 356 values as parameters in a parameter selection request message. For example, the initiator to target bit rate 354 may be used as a data rate send by initiator (DSI) value and the target to initiator bit rate 356 may be used as a data rate received by initiator (DRI) value in the parameter selection request (e.g., PSL_REQ) message.

In one aspect in which a communications device (e.g., 310, 330) was previously operable to use NFC-A RF technology, DSI and DRI may be calculated from the initiator to target bit rate 354 and target to initiator bit rate 356 parameters as follows. When initiator to target bit rate 354 (e.g., CON_BITR_NFC_DEP_I2T) is equal to either 0 or 1, then the NFC peer communications module 350 sets DSI equal to 000b. Further, when initiator to target bit rate 354 (e.g., CON_BITR_NFC_DEP_I2T) is equal to 2, then the NFC peer communications module 350 sets DSI equal to 001b. Additionally, when initiator to target bit rate 354 (e.g., CON_BITR_NFC_DEP_I2T) is equal to or larger than 3, then the NFC peer communications module 350 sets DSI equal to 010b. Similarly, when target to initiator bit rate 356 (e.g., CON_BITR_NFC_DEP_T2I) is equal to either 0 or 1, then the NFC peer communications module 350 sets DRI equal to 000b. When target to initiator bit rate 356 (e.g., CON_BITR_NFC_DEP_T2I) is equal to 2, then the NFC peer communications module 350 sets DRI equal to 001b. When target to initiator bit rate 356 (e.g., CON_BITR_NFC_DEP_T2I) is equal to or larger than 3, then the NFC peer communications module 350 set DRI equal to 010b.

In one aspect in which a communications device (e.g., 310, 330) was previously operable to use NFC-F RF technology, DSI and DRI may be calculated from the initiator to target bit rate 354 and target to initiator bit rate 356 parameters as follows. When initiator to target bit rate 354 (e.g., CON_BITR_NFC_DEP_I2T) is equal to 0, then the NFC peer communications module 350 sets DSI equal to the current Bit rate. When initiator to target bit rate 354 (e.g., CON_BITR_NFC_DEP_I2T) is equal to 1, then the NFC peer communications module 350 sets DSI equal to 000b. When initiator to target bit rate 354 (e.g., CON_BITR_NFC_DEP_I2T) is equal to 2, then the NFC peer communications module 350 sets DSI equal to 001b. When initiator to target bit rate 354 (e.g., CON_BITR_NFC_DEP_I2T) is equal to or larger than 3, then the NFC peer communications module 350 sets DSI equal to 010b. When target to initiator bit rate 356 (e.g., CON_BITR_NFC_DEP_T2I) is equal to 0, then the NFC peer communications module 350 sets DRI equal to the current Bit rate. When target to initiator bit rate 356 (e.g., CON_BITR_NFC_DEP_T2I) is equal to 1, then the NFC peer communications module 350 sets DRI equal to 000b. When target to initiator bit rate 356 (e.g., CON_BITR_NFC_DEP_T2I) is equal to 2, then the NFC peer communications module 350 sets DRI equal to 001b. When target to initiator bit rate 356 (e.g., CON_BITR_NFC_DEP_T2I) is equal to or larger than 3, then the NFC peer communications module 350 sets DRI equal to 010b.

In an aspect, bit rate configuration module 352 may further be configured to use various profile configurations for various aspects associated with NFC related actions. For example, Table 2 describes configuration parameters that may be used for peer-to-peer (P2P) polling. In such an aspect, the technology detection process may use a speed of 424 kbit/s for NFC-F in both directions. In another example of profile configuration parameters, Table 3 provides configuration parameters that may be used during NFC Data Exchange format (NDEF) polling. In another example of profile configuration parameters, Table 4 provides configuration parameters that may be used during P2PNDEF polling.

TABLE 2

P2P Poll Profile Configuration Parameters

| Parameter | P2P |
| --- | --- |
| CON_POLL_A | 0b |
| CON_POLL_B | 0b |
| CON_POLL_F | 1b |
| CON_POLL_P | 0b |
| CON_BAIL_OUT_A | 0b |
| CON_BAIL_OUT_B | 0b |
| CON_DEVICES_LIMIT | 01h |
| CON_ADV_FEAT | 0b |
| CON_ATR | As defined in [DIGITAL] |
| CON_GB | LLCP Parameters |
| CON_RATS | NA |
| CON_ATTRIB | NA |
| CON_BITR_NFC_DEP_I2T | 3 |
| CON_BITR_NFC_DEP_T2I | 3 |

TABLE 3

NDEF Poll Profile Configuration Parameters

| Parameter | NDEF |
| --- | --- |
| CON_POLL_A | 1b |
| CON_POLL_B | 1b |
| CON_POLL_F | 1b |
| CON_POLL_P | 0b |
| CON_BAIL_OUT_A | 0b |
| CON_BAIL_OUT_B | 0b |
| CON_DEVICES_LIMIT | 04h |
| CON_ADV_FEAT | 0b |
| CON_ATR | NA |
| CON_GB | None |
| CON_RATS | As defined in [DIGITAL] |
| CON_ATTRIB | As defined in [DIGITAL] |
| CON_BITR_NFC_DEP_I2T | 0 |
| CON_BITR_NFC_DEP_T2I | 0 |

TABLE 4

P2PNDEF Poll Profile Configuration Parameters

| Parameter | NDEF |
| --- | --- |
| CON_POLL_A | 1b |
| CON_POLL_B | 1b |
| CON_POLL_F | 1b |
| CON_POLL_P | 0b |
| CON_BAIL_OUT_A | 0b |
| CON_BAIL_OUT_B | 0b |
| CON_DEVICES_LIMIT | 04h |
| CON_ADV_FEAT | 0b |
| CON_ATR | As defined in [DIGITAL] |
| CON_GB | LLCP Parameters |
| CON_RATS | As defined in [DIGITAL] |
| CON_ATTRIB | As defined in [DIGITAL] |
| CON_BITR_NFC_DEP_I2T | 3 |
| CON_BITR_NFC_DEP_T2I | 3 |

In another aspect, NFC peer communications module 350 may further include bit rate output module 358 that may be operable to provide the target bit rate 354 and target to initiator bit rate 356 values for use in one or more other communication establishment processes (e.g., a resolution process). Table 5 provides example output parameter values generated during device activation.

TABLE 5

Device Activation Activity - Output Parameters

| Name | Format | Size | Description |
| --- | --- | --- | --- |
| INT_INDEX | Integer | 1 Byte | Index to the identifier of the device activated |
| INT_DX_BIT_RATE_I2T | Integer | 1 Byte | Current Bitrate in case of NFC_DEP activation in the direction from Initiator to Target: 0: maintain bit rate 1: 106 kbps 2: 212 kbps 3: 424 kbps |
| INT_DX_BIT_RATE_T2I | Integer | 1 Byte | Current Bitrate in case of NFC_DEP activation in the direction from Target to Initiator: 0: maintain bit rate 1: 106 kbps 2: 212 kbps 3: 424 kbps |

As seen in Table 5, initiator to target bit rate 354 may be indicated using the INT_DX_BIT_RATE_I2T parameter and a target to initiator bit rate 346 may be indicated using the INT_DX_BIT_RATE_T2I parameter. In an aspect, the bit rate output module 358 may handle the PSL_REQ Response. In such an aspect, when a Valid PSL_RES Response is received, the bit rate output module 358 sets INT_DX_BIT_RATE_I2T according to the bit rate specified by the DSI parameter of PSL_REQ, and sets INT_DX_BIT_RATE_T2I according to the bit rate specified by the DRI parameter of PSL_REQ.

In operation, communications device 310 may transmit the parameter selection request message to a remote NFC device 330. Based at least in part on the DSI value included in the parameter selection request message, the remote NFC device 330 may determine which NFC RF technology may be used for peer communications. For example, in an aspect, where the remote NFC device 330 is in a ready state for NFC-A based communications, and the DSI value is set to a zero value (e.g., 000b), then the remote NFC device 330 maintains a ready state for NFC-A based peer communications. In another example aspect, where the remote NFC device 330 is in a ready state for NFC-A based communications, and the DSI value is set to a non-zero value (e.g., 001b, 010b), then the remote NFC device 330 may switch from a NFC-A ready state to a NFC-F ready state. In still another aspect, where the remote NFC device 330 is in a ready state for NFC-F based communications, and the DSI value is set to a zero value (e.g., 000b), then the remote NFC device 330 may switch from a NFC-F ready state to a NFC-A ready state. In another example aspect, where the remote NFC device 330 is in a ready state for NFC-F based communications, and the DSI value is set to a non-zero value (e.g., 001b, 010b), then the remote NFC device 330 maintains a ready state for NFC-F based peer communications.

Continuing the above operational aspect, remote NFC device 330 may respond to the parameter selection request message with a response indicating successful receipt of the parameter selection request message. Thereafter, communications device 310 bit rate output module 358 may indicate the target bit rate 354 and target to initiator bit rate 356 values as outputs associated with a device activation process.

Therefore, a system and method is disclosed to provide peer communications between communications device 310 and remote NFC device 330 in which different bit rate may be used in each direction.

Figure 4:
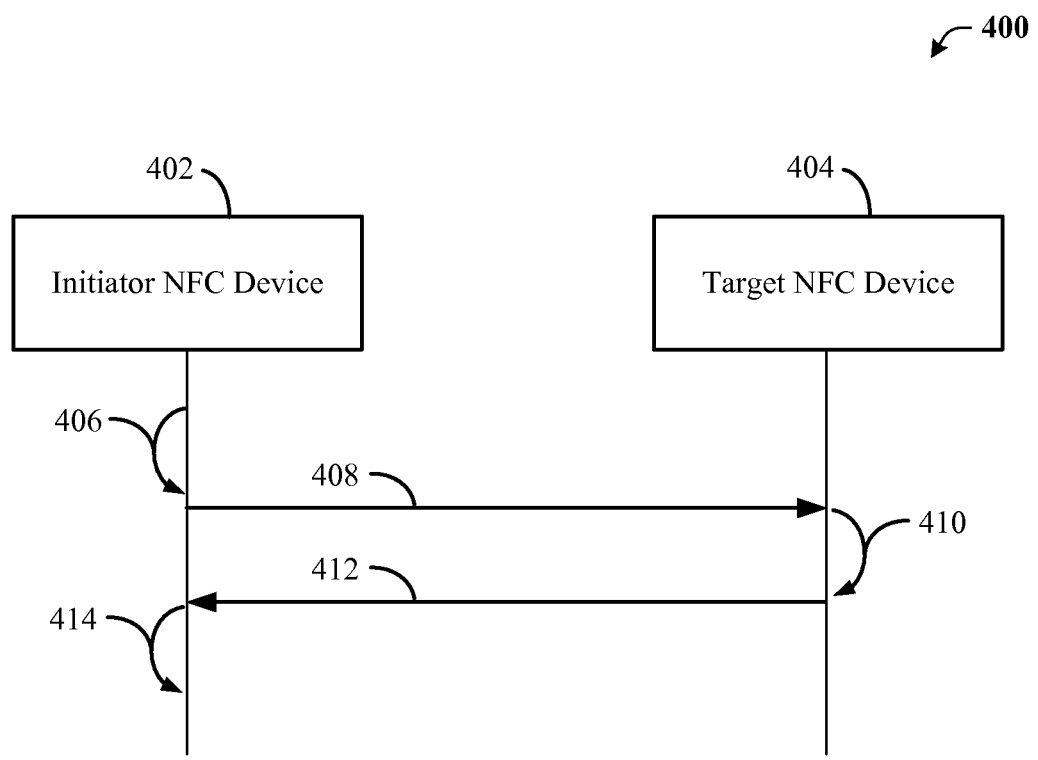
FIG. 4 is a call flow diagram describing an example of using different bit rates in each direction for NFC peer mode communications, according to an aspect.
Figure 5:
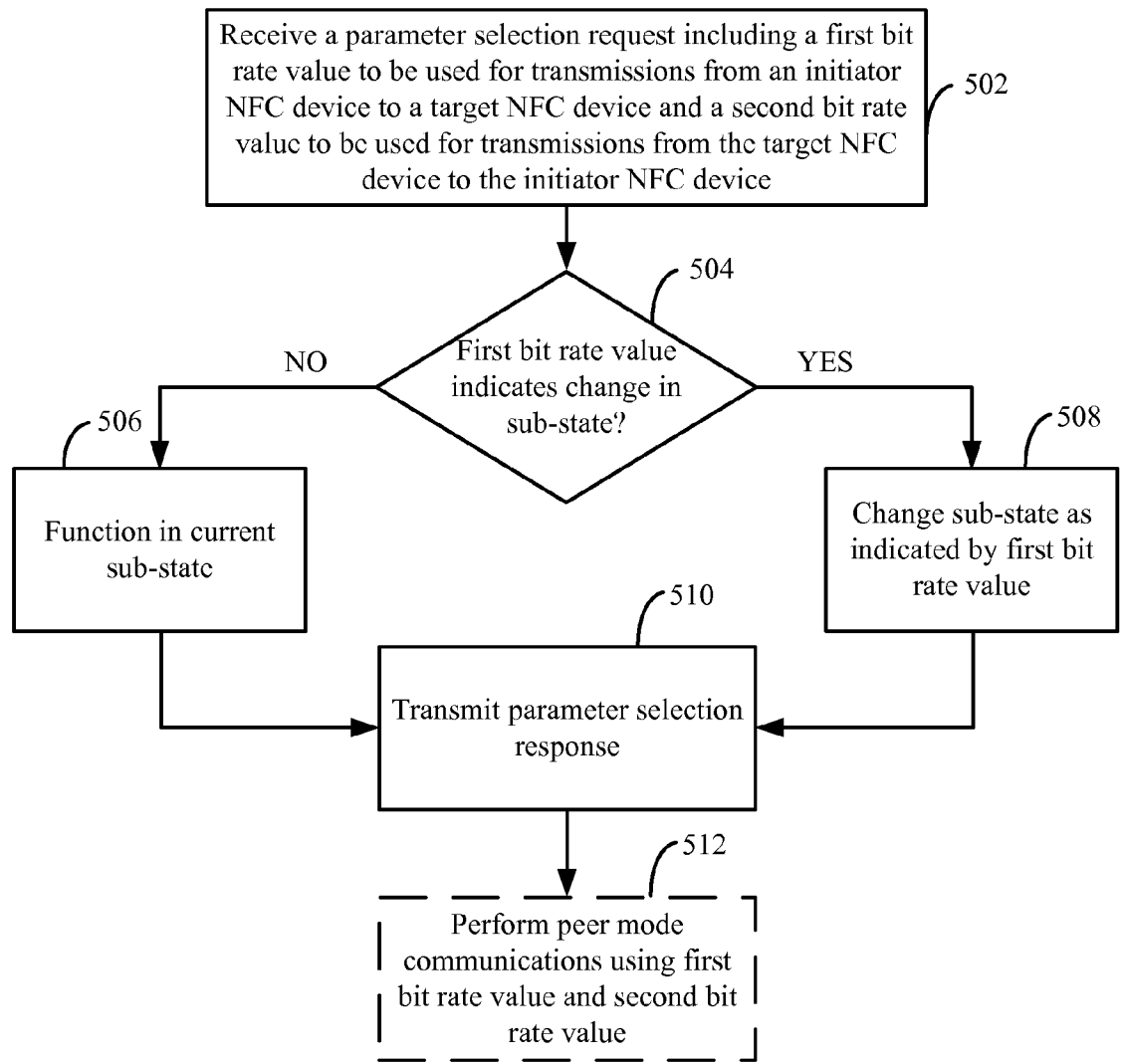
FIG. 5 is a flowchart describing an example of using different bit rates in each direction for NFC peer mode communications, according to an aspect.
Figure 6:
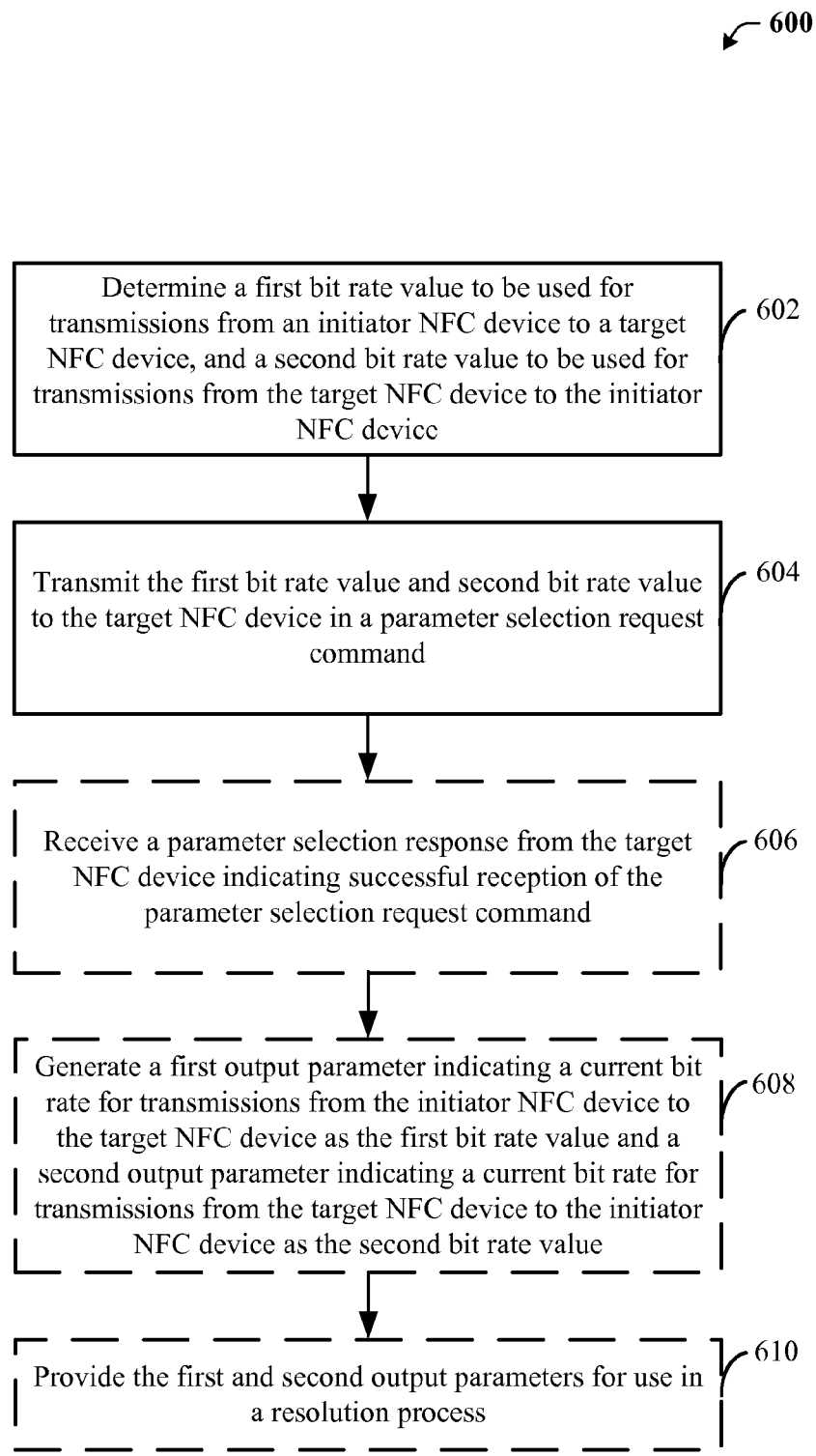
FIG. 6 is a flowchart describing another example of using different bit rates in each direction for NFC peer mode communications, according to an aspect.

FIGS. 4-6 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts a call flow diagram conceptually illustrating communications between an initiator NFC device 402 and a target NFC device 404 a communications environment 400, according to an aspect. Communications environment 400 may include initiator NFC device 402 and target NFC device 404.

At act 406, initiator NFC device may configure one or more parameters associated with establishment of peer mode communications. In an aspect, initiator NFC device may configure different bit rate values to be used in each direction detect of communications during peer mode communications. As described above, an initiator to target bit rate may be indicated using the CON_BITR_NFC_DEP_I2T parameter and a target to initiator bit rate may be indicated using the CON_BITR_NFC_DEP_T2I parameter. Further configuration parameters are provided in Table 1 above.

At act 408, initiator NFC device may transmit a parameter selection request message to a target NFC device as part of establishment of a peer communication link. In an aspect, the target bit rate configured at act 406 may be used as a data rate send by initiator (DSI) value and the target to initiator bit rate configured at act 406 may be used as a data rate received by initiator (DRI) value in the parameter selection request (e.g., PSL_REQ) message.

At act 410, the target NFC device may interpret the parameter selection request message. In an aspect, the target NFC device may modify one or more configurations based on information in the received parameter selection request message. For example, in an aspect, where the target NFC device 404 is in a ready state for NFC-A based communications, and the DSI value is set to a zero value (e.g., 000b), then the target NFC device 404 may maintain a ready state for NFC-A based peer communications. In another example aspect, where the target NFC device 404 is in a ready state for NFC-A based communications, and the DSI value is set to a non-zero value (e.g., 001b, 010b), then the target NFC device 404 may change from a NFC-A ready state to a NFC-F ready state. In another example aspect, where the target NFC device 404 is in a ready state for NFC-A based communications, and the DSI value is set to a zero value (e.g., 000), then the target NFC device 404 may maintain a NFC-A ready state for communications uses NFC-A technology in the direction from Initiator to Target. In still another aspect, where the target NFC device 404 is in a ready state for NFC-F based communications, and the DSI value is set to a zero value (e.g., 000b), then target NFC device 404 may switch from a NFC-F ready state to a NFC-A ready state. In another example aspect, where the target NFC device 404 is in a ready state for NFC-F based communications, and the DSI value is set to a non-zero value (e.g., 001b, 010b), then the target NFC device 404 may maintain a ready state for NFC-F based peer communications.

At act 412, the target NFC device 404 transmits a parameter selection response message to the initiator NFC device 402.

At act 414, the initiator NFC device 402 may generate one or more output values after receipt of the parameter selection response. Examples of output parameters are provided in able 2 above.

FIG. 5 depicts a flowchart describing an example process 500 in which different bit rates may be used in each direction for NFC peer mode communications.

At block 502, a target NFC device may receive a parameter selection request message. In an aspect, the parameter selection request message may include a first bit rate value to be used for transmissions from an initiator NFC device to the target NFC device and a second bit rate value to be used for transmissions from the target NFC device to the initiator NFC device. In an aspect, the first bit rate value and the second bit rate value may be a value indicating maintenance of a currently set bit rate, a value indicating 106 kbps, a value indicating 212 kbps, a value indicating 424 kbps, etc. In another aspect, the first bit rate value may be a data rate send by the initiator (DSI) value, and the second bit rate value may be a data rate receive to initiator (DRI) value in a parameter selection request (PSL_REQ) message.

At block 504, the target NFC device may determine whether to change a ready sub-state based on the received message. Where the target NFC device is in a ready state for NFC-A based communications, and the DSI value is set to a zero value (e.g., 000b), then at block 506, the target NFC device may maintain a ready state for NFC-A based peer communications. Further, where the target NFC device is in a ready state for NFC-A based communications, and the DSI value is set to a non-zero value (e.g., 001b, 010b), then at block 508, the target NFC device may change from a NFC-A ready state to a NFC-F ready state. In another aspect, where the target NFC device is in a ready state for NFC-F based communications, and the DSI value is set to a zero value (e.g., 000b), then at block 508, target NFC device may switch from a NFC-F ready state to a NFC-A ready state. Further, where the target NFC device is in a ready state for NFC-F based communications, and the DSI value is set to a non-zero value (e.g., 001b, 010b), then at block 506, the target NFC device may maintain a ready state for NFC-F based peer communications.

At block 510, the target NFC device may transmit a parameter selection response (e.g., PSL_RES) message indicating successful receipt of the PSL_RQ message.

In an optional aspect, at block 512, based on the values received in the PSL_REQ message, the target NFC device and the initiator NFC device may perform peer mode communications using the first bit rate for transmissions from the initiator NFC device to the target NFC device and a second bit rate for transmissions from the target NFC device to the initiator NFC device.

FIG. 6 depicts a flowchart describing another example process 600 in which different bit rates may be used in each direction for NFC peer mode communications.

At block 602, an initiator NFC device determine a first bit rate value to be used for transmissions from an initiator NFC device to a target NFC device and a second bit rate value to be used for transmissions from the target NFC device to the initiator NFC device. In an aspect, the first bit rate value and the second bit rate value may be a value indicating maintenance of a currently set bit rate, a value indicating 106 kbps, a value indicating 212 kbps, a value indicating 424 kbps, etc.

At block 604, the initiator NFC device may transmit the first bit rate value and the second bit rate value to the target NFC device in a parameter selection request message. In another aspect, the first bit rate value may be a data rate send by the initiator (DSI) value, and the second bit rate value may be a data rate receive to initiator (DRI) value in the parameter selection request (PSL_REQ) command.

In an optional aspect, at block 606, the initiator NFC device may receive a parameter selection response (e.g. PSL_RES) from the target NFC device.

In another optional aspect, the initiator NFC device may generate a first output parameter indicating a current bit rate for transmissions from the initiator NFC device to the target NFC device as the first bit rate value and a second output parameter indicating a current bit rate for transmissions from the target NFC device to the initiator NFC device as the second bit rate value.

In such an optional aspect, at block 610, the generated output parameters may be provided for use in one or more other processes associated with establishment of peer mode communications (e.g., a resolution process).

Figure 7:
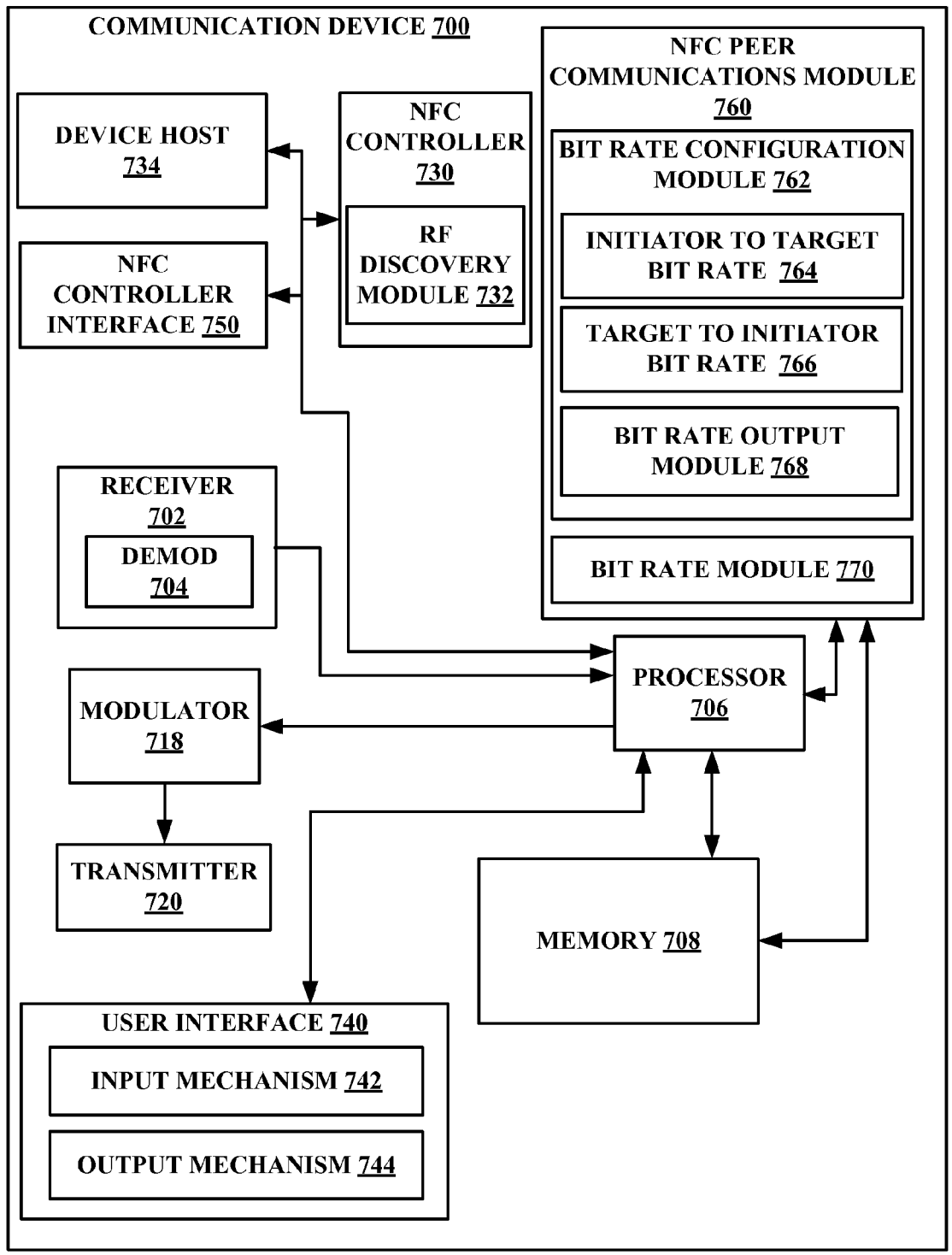
FIG. 7 is a function block diagram example architecture of a communications device, according to an aspect.

While referencing FIG. 3, but turning also now to FIG. 7, an example architecture of communications device 700 is illustrated. As depicted in FIG. 7, communications device 700 comprises receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706.

Communications device 700 can additionally comprise memory 708 that is operatively coupled to various components, such as but not limited processor 706 and that can store data to be transmitted, received data, information related to available channels, TCP flows, data associated with analyzed signal and/or interference strength, information related to an assigned channel, power, rate, or the like, and any other suitable information for assisting in NFC peer mode connection establishment.

Further, processor 706, device host 734, NFCC 730, and/or NFC peer communications module 760 can provide means for receiving a parameter selection request including a first bit rate value to be used for transmissions from an initiator NFC device to the target NFC device and a second bit rate value to be used for transmissions from the target NFC device to the initiator NFC device, and means for functioning in either a first target sub-state or a second target sub-state based on the first bit rate value. The first target sub-state may be associated with peer communications based on a first NFC RF technology. The second target sub-state may be associated with peer communications based on a second NFC RF technology.

Still further, processor 706, device host 734, NFCC 730, and/or NFC peer communications module 760 can provide means for determining a first bit rate value to be used for transmissions from an initiator NFC device to a target NFC device and a second bit rate value to be used for transmissions from the target NFC device to the initiator NFC device, and means for transmitting the first bit rate value and the second bit rate value to the target NFC device in a parameter selection request message.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

Communications device 700 may include a NFC controller 730. In an aspect, NFCC 730 may include RF discovery module 732. RF discovery module 732 may be operable to perform RF discovery using a RF discovery loop (e.g., 710) as part of a discovery process to enable peer mode communications. DH 734 may be operable to generate a command to prompt NFCC 730 to perform various NFC actions, such as but not limited to, RF discovery, etc.

In another aspect, communications device 700 may include NCI 750. In an aspect, NCI 750 may be operable to enable communications between a NFC enabled antenna (e.g., 702, 720), NFC controller 730 and DH 734. NCI 750 may be operable to function in a listening mode and/or a polling mode. During passive communication mode communications, whichever mode the communications device 700 begins peer communications as is the mode that the communications device 700 may remain for the duration of the peer communications. During active communication mode communications, communications device 700 may switch listening mode and polling mode responsibilities during a peer communications link.

In another aspect, communications device 700 may include NFC peer communications module 760. NFC peer communications module 760 may be operable to enable various modes and/or configurations for peer communications. In an aspect, NFC peer communications module 760 may include bit rate configuration module 762 that may be operable to configure peer mode communications in which different bit rates may be used in each direction. In an aspect, bit rate configuration module 762 may configure an initiator to target bit rate 764 and a target to initiator bit rate 766. In an aspect, the initiator to target bit rate 764 may be the same as the target to initiator bit rate 766. In another aspect, bit rate configuration module 762 may configure the target bit rate 764 and target to initiator bit rate 766 with a value that prompts communications device 700 to maintain a current (e.g., default bit rate). For example, where a communications device is in a ready state to support NFC-F RF technology based communications, a default value of 424 kilobits per second (kbps) may be used. In another aspect, bit rate configuration module 762 may configure the target bit rate 764 and target to initiator bit rate 766 with values that prompt communications device 700 to use one or a plurality of bit rate options. For example, the different bit rate options may include, but are not limited to, 106 kbps, 212, kbps, 424 kbps, etc.

In an aspect, NFC peer communications module 760 may include bit rate module 770 that may be operable to determine a bit rate for use for communications from an initiator NFC device and for communications to the initiator NFC device. In an aspect, bit rate module 770 may be provided with different bit rates values for use in each direction for NFC peer mode communications.

In another aspect, NFC peer communications module 760 may be operable to perform any of the one or more processes described with respect to FIGS. 4-6.

Additionally, communications device 700 may include user interface 740. User interface 740 may include input mechanisms 742 for generating inputs into communications device 700, and output mechanism 744 for generating information for consumption by the user of the communications device 700. For example, input mechanism 742 may include a mechanism such as a key or keyboard, a mouse, a touch-screen display, a microphone, etc. Further, for example, output mechanism 744 may include a display, an audio speaker, a haptic feedback mechanism, etc. In the illustrated aspects, the output mechanism 744 may include a display operable to present media content that is in image or video format or an audio speaker to present media content that is in an audio format.

Figure 8:
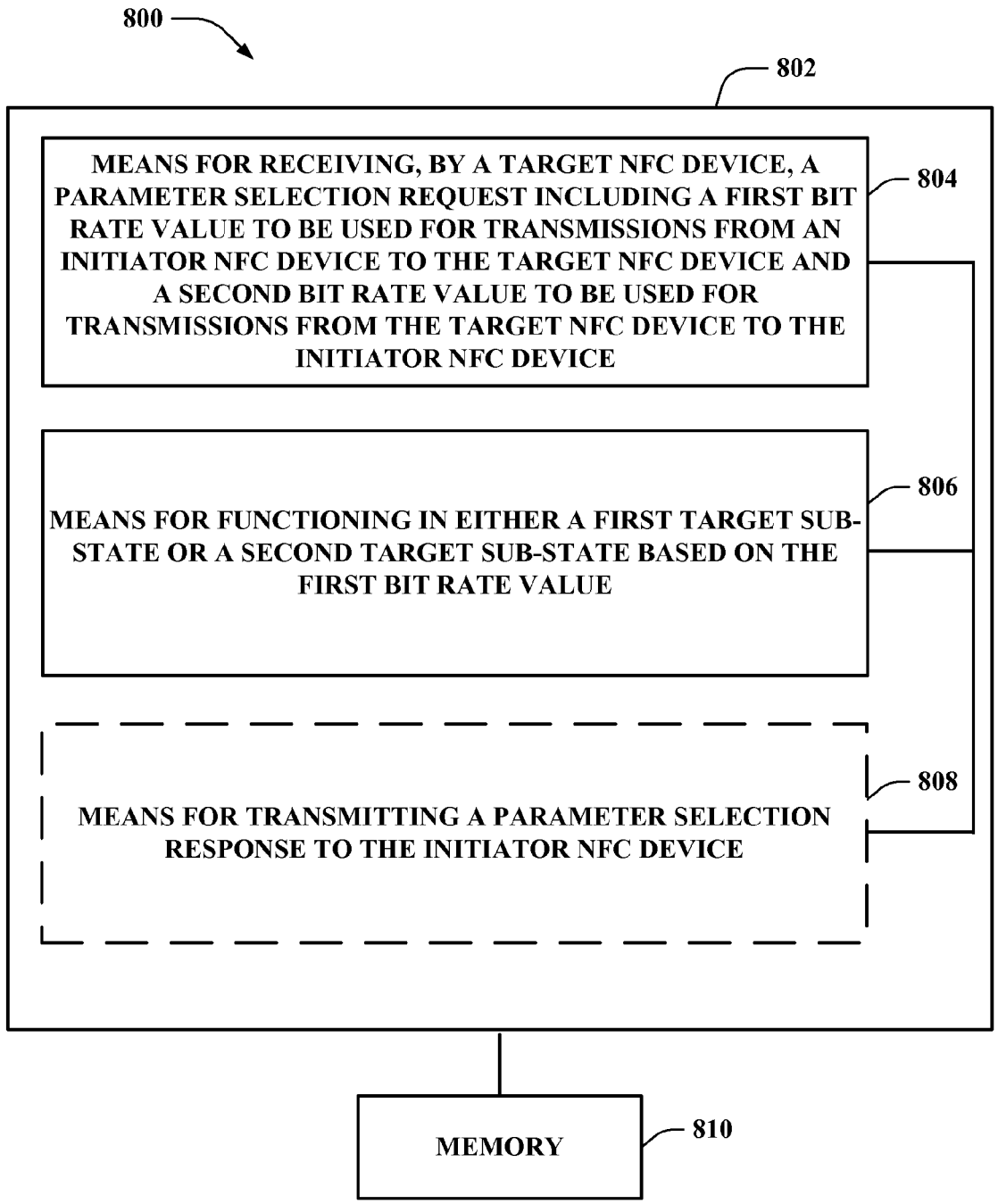
FIG. 8 is a block diagram of an example communication system for using different bit rates in each direction for NFC peer mode communications, according to an aspect.

FIG. 8 depicts a block diagram of an exemplary communication system 800 operable to enable specification of different bit rates in each direction for NFC peer communications, according to an aspect. For example, system 800 can reside at least partially within a communications device (e.g., communications device 700). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, logical grouping 802 can include an electrical component that may provide means for receiving, by a target NFC device, a parameter selection request including a first bit rate value to be used for transmissions from an initiator NFC device to the target NFC device and a second bit rate value to be used for transmissions from the target NFC device to the initiator NFC device 804. In an aspect, the first bit rate value and the second bit rate value each may include a bit rate value such as but not limited to a value indicating maintenance of a currently set bit rate, a value indicating 106 kbps, a value indicating 212 kbps, a value indicating 424 kbps, etc. In another aspect, the first bit rate value may be a DSI value, and the second bit rate value may be a DRI value.

Further, logical grouping 802 can include an electrical component that may provide means for functioning in either a first target sub-state or a second target sub-state based on the first bit rate value 806. In an aspect, the first target sub-state may be associated with peer communications based on a first NFC RF technology and the second target sub-state may be associated with peer communications based on a second NFC RF technology. In another aspect, the first target sub-state and the second target sub-state may each be a sub-state such as but not limited to a TARGET_A sub-state, a TARGET_F sub-state, etc. In such an aspect, TARGET_A sub-state may be associated with peer communications based on a NFC-A RF technology, and TARGET_F sub-state may be associated with peer communications based on a NFC-F RF technology.

Moreover, in an optional aspect, logical grouping 802 can include an electrical component that may provide means for transmitting a parameter selection response (e.g., PSL_REQ) to the initiator NFC device 808. In an aspect, the parameter selection response message may be transmitted in response to receipt of a parameter selection request (e.g., PSL_REQ) message from the initiator NFC device.

Additionally, system 800 can include a memory 810 that retains instructions for executing functions associated with the electrical components 804, 806, and 808, stores data used or obtained by the electrical components 804, 806, 808, etc. While shown as being external to memory 810, it is to be understood that one or more of the electrical components 804, 806, and 808 may exist within memory 810. In one example, electrical components 804, 806, and 808 can include at least one processor, or each electrical component 804, 806, and 808 can be a corresponding module of at least one processor. Moreover, in an additional or alternative example, electrical components 804, 806, and 808 may be a computer program product including a computer readable medium, where each electrical component 804, 806, and 808 may correspond to code.

Figure 9:
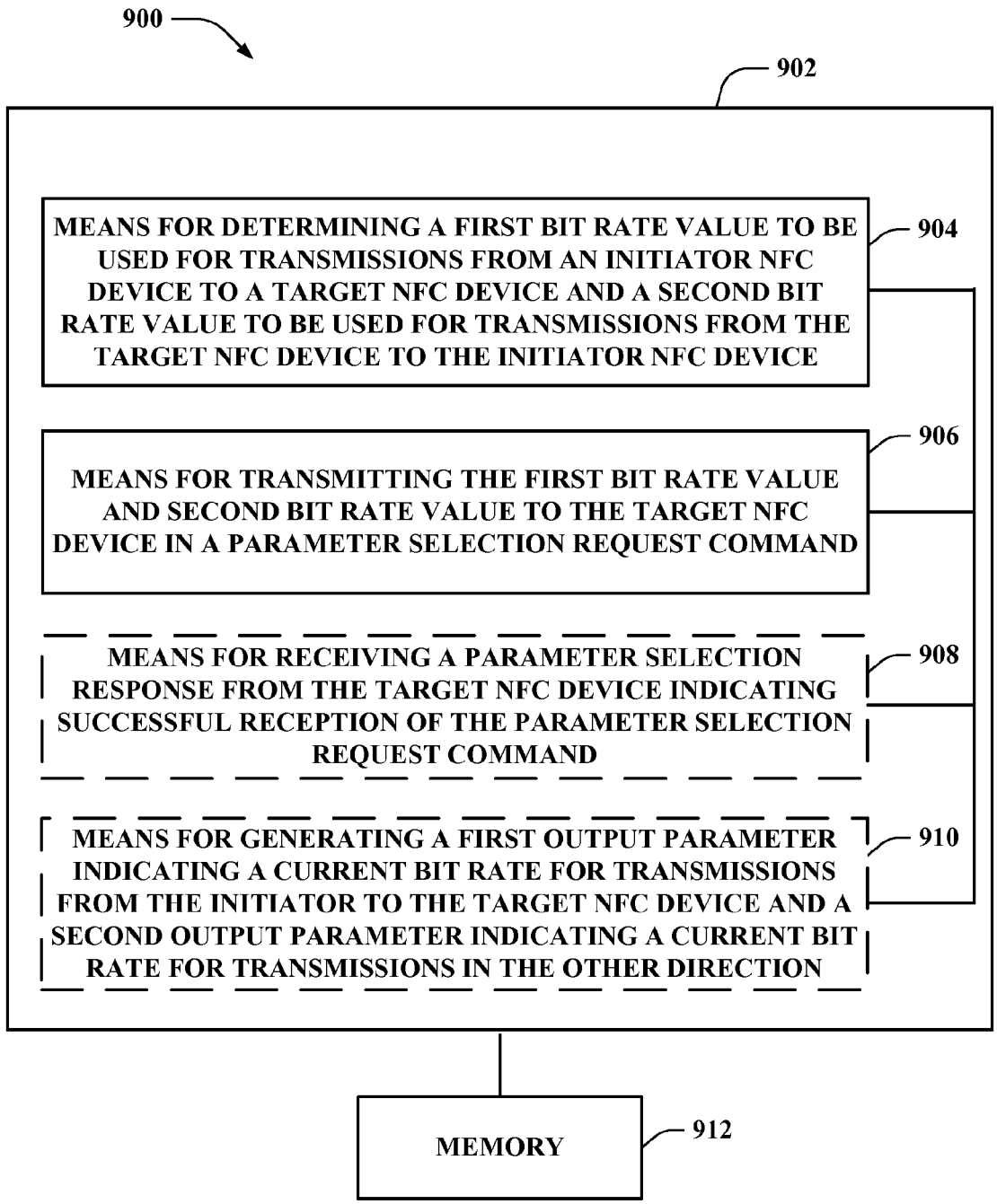
FIG. 9 is a block diagram of an example communication system for using different bit rates in each direction for NFC peer mode communications, according to an aspect.

FIG. 9 depicts a block diagram of an exemplary communication system 900 operable to enable specification of different bit rates in each direction for NFC peer communications, according to an aspect. For example, system 900 can reside at least partially within a communications device (e.g., communications device 700). It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, logical grouping 902 can include an electrical component that may provide means for determining, by an initiator NFC device, a first bit rate value to be used for transmissions from the initiator NFC device to a target NFC device and a second bit rate value to be used for transmissions from the target NFC device to the initiator NFC device 904. In an aspect, the first bit rate value and the second bit rate value each may include a bit rate value such as but not limited to a value indicating maintenance of a currently set bit rate, a value indicating 106 kbps, a value indicating 212 kbps, a value indicating 424 kbps, etc. In another aspect, the first bit rate value may be a DSI value, and the second bit rate value may be a DRI value.

Further, logical grouping 902 can include an electrical component that may provide means for transmitting the first bit rate value and the second bit rate value to the target NFC device in a parameter selection request (e.g., PSL_REQ) message 906.

Further, in an optional aspect, logical grouping 902 can include an electrical component that may provide means for receiving a parameter selection response (e.g., PSL_REQ) from the target NFC device indicating successful reception of the parameter selection request message 908. In an aspect, the parameter selection response message may be transmitted in response to receipt of the transmitted parameter selection request (e.g., PSL_REQ) message from the initiator NFC device.

Moreover, in another optional aspect, logical grouping 902 can include an electrical component that may provide means for generating a first output parameter indicating a current bit rate for transmissions from the initiator NFC device to the target NFC device as the first bit rate value and a second output parameter indicating a current bit rate for transmissions from the target NFC device to the initiator NFC device as the second bit rate value 910. In such an aspect, the means for generating 910 may further include means for providing the first and second output parameters for use in a resolution process.

Additionally, system 900 can include a memory 912 that retains instructions for executing functions associated with the electrical components 904, 906, 908, and 910, stores data used or obtained by the electrical components 904, 906, 908, 910, etc. While shown as being external to memory 912, it is to be understood that one or more of the electrical components 904, 906, 908, and 910 may exist within memory 912. In one example, electrical components 904, 906, 908, and 910 can include at least one processor, or each electrical component 904, 906, 908, and 910 can be a corresponding module of at least one processor. Moreover, in an additional or alternative example, electrical components 904, 906, 908, and 910 may be a computer program product including a computer readable medium, where each electrical component 904, 906, 908, and 910 may correspond to code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communications device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
    receiving, by a target near field communication (NFC) device, a parameter selection request including a first bit rate value to be used for transmissions from an initiator NFC device to the target NFC device and a second bit rate value to be used for transmissions from the target NFC device to the initiator NFC device; and
    selecting one of a first target sub-state or a second target sub-state based on the first bit rate value, wherein the first target sub-state is associated with peer communications based on a first NFC radio frequency (RF) technology, and wherein the second target sub-state is associated with peer communications based on a second NFC RF technology; and
    functioning in the selected one of the first target sub-state or the second target sub-state.

2. The method of claim 1, further comprising transmitting a parameter selection response to the initiator NFC device.

3. The method of claim 1, wherein the first bit rate value and the second bit rate value each include a bit rate value from among: a value indicating maintenance of a currently set bit rate, a value indicating 106 kbps, a value indicating 212 kbps, or a value indicating 424 kbps.

4. The method of claim 1, wherein the first target sub-state and the second target sub-state are each a sub-state from among: a TARGET_A sub-state or a TARGET_F sub-state, wherein the TARGET_A sub-state is associated with peer communications based on a NFC-A RF technology, and wherein the TARGET_F sub-state is associated with peer communications based on a NFC-F RF technology.

5. The method of claim 1, wherein the first bit rate value is a data rate send by the initiator (DSI) value, and wherein the second bit rate value is a data rate receive to initiator (DRI) value.

6. A method of wireless communications, comprising:
    determining, by an initiator NFC device, based at least in part on a previously operable NFC radio frequency (RF) technology of the initiator NFC device, a first bit rate value to be used for transmissions from the initiator NFC device to a target NFC device and a second bit rate value to be used for transmissions from the target NFC device to the initiator NFC device,
    wherein the previously operable NFC RF technology of the initiator NFC device is one of a NFC-A RF technology and a NFC-F RF technology;
    transmitting the first bit rate value and the second bit rate value to the target NFC device in a parameter selection request message;
    communicating, from the initiator NFC device to the target NFC device, at the first bit rate value, according to one of the NFC-A RF technology and the NFC-F RF technology selected by the target NFC device.

7. The method of claim 6, further comprising receiving a parameter selection response from the target NFC device indicating successful reception of the parameter selection request message.

8. The method of claim 6, further comprising:
    generating a first output parameter indicating a current bit rate for transmissions from the initiator NFC device to the target NFC device as the first bit rate value and a second output parameter indicating a current bit rate for transmissions from the target NFC device to the initiator NFC device as the second bit rate value; and
    providing the first and second output parameters for use in a resolution process.

9. The method of claim 6, wherein the first bit rate value and the second bit rate value each include a bit rate value from among: a value indicating maintenance of a currently set bit rate, a value indicating 106 kbps, a value indicating 212 kbps, or a value indicating 424 kbps.

10. The method of claim 6, wherein the first bit rate value is a data rate send by the initiator (DSI) value, and wherein the second bit rate value is a data rate receive to initiator (DRI) value.

11. A non-transitory computer-readable medium storing computer executable code, comprising code for:
    receiving, by a target near field communication (NFC) device, a parameter selection request including a first bit rate value to be used for transmissions from an initiator NFC device to the target NFC device and a second bit rate value to be used for transmissions from the target NFC device to the initiator NFC device; and selecting one of a first target sub-state or a second target sub-state based on the first bit rate value, wherein the first target sub-state is associated with peer communications based on a first NFC radio frequency (RF) technology, and wherein the second target sub-state is associated with peer communications based on a second NFC RF technology; and functioning in the selected one of the first target sub-state or the second target sub-state.

12. The non-transitory computer-readable medium of claim 11, further comprising code for:

transmitting a parameter selection response to the initiator NFC device.

13. The non-transitory computer-readable medium of claim 11, wherein the first bit rate value and the second bit rate value each include a bit rate value from among: a value indicating maintenance of a currently set bit rate, a value indicating 106 kbps, a value indicating 212 kbps, or a value indicating 424 kbps.

14. The non-transitory computer-readable medium of claim 11, wherein the first target sub-state and the second target sub-state are each a sub-state from among: a TARGET_A sub-state or a TARGET_F sub-state, wherein the TARGET_A sub-state is associated with peer communications based on a NFC-A RF technology, and wherein the TARGET_F sub-state is associated with peer communications based on a NFC-F RF technology.

15. The non-transitory computer-readable medium of claim 11, wherein the first bit rate value is a data rate send by the initiator (DSI) value, and wherein the second bit rate value is a data rate receive to initiator (DRI) value.

16. A non-transitory computer-readable medium storing computer executable code, comprising code for:

determining, by an initiator NFC device, based at least in part on a previously operable NFC radio frequency (RF) technology of the initiator NFC device, a first bit rate value to be used for transmissions from the initiator NFC device to a target NFC device and a second bit rate value to be used for transmissions from the target NFC device to the initiator NFC device, wherein the previously operable NFC RF technology is one of a NFC-A RF technology and a NFC-F RF technology;

transmitting the first bit rate value and the second bit rate value to the target NFC device in a parameter selection request message; and communicating, from the initiator NFC device to the target NFC device, at the first bit rate value, according to one of the NFC-A RF technology and the NFC-F RF technology selected by the target NFC device.

17. The non-transitory computer-readable medium of claim 16, further comprising code for:

receiving a parameter selection response from the target NFC device indicating successful reception of the parameter selection request message.

18. The non-transitory computer-readable medium of claim 16, further comprising code for:

generating a first output parameter indicating a current bit rate for transmissions from the initiator NFC device to the target NFC device as the first bit rate value and a second output parameter indicating a current bit rate for transmissions from the target NFC device to the initiator NFC device as the second bit rate value; and providing the first and second output parameters for use in a resolution process.

19. The non-transitory computer-readable medium of claim 16, wherein the first bit rate value and the second bit rate value each include a bit rate value from among: a value indicating maintenance of a currently set bit rate, a value indicating 106 kbps, a value indicating 212 kbps, or a value indicating 424 kbps.

20. The non-transitory computer-readable medium of claim 16, wherein the first bit rate value is a data rate send by the initiator (DSI) value, and wherein the second bit rate value is a data rate receive to initiator (DRI) value.

21. An apparatus for wireless communications, comprising:

means for receiving, by a target near field communication (NFC) device, a parameter selection request including a first bit rate value to be used for transmissions from an initiator NFC device to the target NFC device and a second bit rate value to be used for transmissions from the target NFC device to the initiator NFC device; and means for selecting one of a first target sub-state or a second target sub-state based on the first bit rate value, wherein the first target sub-state is associated with peer communications based on a first NFC radio frequency (RF) technology, and wherein the second target sub-state is associated with peer communications based on a second NFC RF technology; and means for functioning in the selected one of the first target sub-state or the second target sub-state.

22. The apparatus of claim 21, further comprising:

means for transmitting a parameter selection response to the initiator NFC device.

23. The apparatus of claim 21, wherein the first bit rate value and the second bit rate value each include a bit rate value from among: a value indicating maintenance of a currently set bit rate, a value indicating 106 kbps, a value indicating 212 kbps, or a value indicating 424 kbps.

24. The apparatus of claim 21, wherein the first target sub-state and the second target sub-state are each a sub-state from among: a TARGET_A sub-state or a TARGET_F sub-state, wherein the TARGET_A sub-state is associated with peer communications based on a NFC-A RF technology, and wherein the TARGET_F sub-state is associated with peer communications based on a NFC-F RF technology.

25. The apparatus of claim 21, wherein the first bit rate value is a data rate send by the initiator (DSI) value, and wherein the second bit rate value is a data rate receive to initiator (DRI) value.

26. An apparatus for wireless communications, comprising:

means for determining, by an initiator NFC device, based at least in part on a previously operable NFC radio frequency (RF) technology of the initiator NFC device, a first bit rate value to be used for transmissions from the initiator NFC device to a target NFC device and a second bit rate value to be used for transmissions from the target NFC device to the initiator NFC device, wherein the previously operable NFC RF technology is one of a NFC-A RF technology and a NFC-F RF technology;

means for transmitting the first bit rate value and the second bit rate value to the target NFC device in a parameter selection request message;

means for communicating, from the initiator NFC device to the target NFC device, at the first bit rate value, according to one of the NFC-A RF technology and the NFC-F RF technology selected by the target NFC device.

27. The apparatus of claim 26, further comprising:
means for receiving a parameter selection response from the target NFC device indicating successful reception of the parameter selection request message.

28. The apparatus of claim 26, further comprising:
means for generating a first output parameter indicating a current bit rate for transmissions from the initiator NFC device to the target NFC device as the first bit rate value and a second output parameter indicating a current bit rate for transmissions from the target NFC device to the initiator NFC device as the second bit rate value; and
means for providing the first and second output parameters for use in a resolution process.

29. The apparatus of claim 26, wherein the first bit rate value and the second bit rate value each include a bit rate value from among: a value indicating maintenance of a currently set bit rate, a value indicating 106 kbps, a value indicating 212 kbps, or a value indicating 424 kbps.

30. The apparatus of claim 26, wherein the first bit rate value is a data rate send by the initiator (DSI) value, and wherein the second bit rate value is a data rate receive to initiator (DRI) value.

31. An apparatus for NFC communications, comprising:
a memory;
a processor coupled to the memory;
a transceiver configured to receive a parameter selection request including a first bit rate value to be used for transmissions from an initiator NFC device to a target NFC device and a second bit rate value to be used for transmissions from the target NFC device to the initiator NFC device; and
a NFC peer mode communications module coupled to at least one of the memory or the processor and configured to:
select one of a first target sub-state or a second target sub-state based on the first bit rate value, wherein the first target sub-state is associated with peer communications based on a first NFC radio frequency (RF) technology, and wherein the second target sub-state is associated with peer communications based on a second NFC RF technology, and function in the selected one of the first target sub-state or the second target sub-state.

32. The apparatus for NFC communications of claim 31, wherein the transceiver is further configured to:
transmit a parameter selection response to the initiator NFC device.

33. The apparatus for NFC communications of claim 31, wherein the first bit rate value and the second bit rate value each include a bit rate value from among: a value indicating maintenance of a currently set bit rate, a value indicating 106 kbps, a value indicating 212 kbps, or a value indicating 424 kbps.

34. The apparatus for NFC communications of claim 31, wherein the first target sub-state and the second target sub-state are each a sub-state from among: a TARGET_A sub-state or a TARGET_F sub-state, wherein the TARGET_A sub-state is associated with peer communications based on a NFC-A RF technology, and wherein the TARGET_F sub-state is associated with peer communications based on a NFC-F RF technology.

35. The apparatus for NFC communications of claim 31, wherein the first bit rate value is a data rate send by the initiator (DSI) value, and wherein the second bit rate value is a data rate receive to initiator (DRI) value.

36. An apparatus for NFC communications, comprising:
a transceiver;
a memory;
a processor coupled to the memory; and
a NFC peer mode communications module coupled to at least one of the memory or the processor and configured to:
determine, based at least in part on a previously operable NFC radio frequency (RF) technology of the initiator NFC device, a first bit rate value to be used for transmissions from an initiator NFC device to a target NFC device and a second bit rate value to be used for transmissions from the target NFC device to the initiator NFC device, wherein the previously operable NFC RF technology is one of a NFC-A RF technology and a NFC-F RF technology; and
wherein the transceiver is configured to transmit the first bit rate value and the second bit rate value to the target NFC device in a parameter selection request message; and
communicating, from the initiator NFC device to the target NFC device, at the first bit rate value, according to one of the NFC-A RF technology and the NFC-F RF technology selected by the target NFC device.

37. The apparatus for NFC communications of claim 36, wherein the transceiver is configured to receive a parameter selection response from the target NFC device indicating successful reception of the parameter selection request message.

38. The apparatus for NFC communications of claim 36, wherein the NFC peer mode communications module is further configured to:
generate a first output parameter indicating a current bit rate for transmissions from the initiator NFC device to the target NFC device as the first bit rate value and a second output parameter indicating a current bit rate for transmissions from the target NFC device to the initiator NFC device as the second bit rate value; and
provide the first and second output parameters for use in a resolution process.

39. The apparatus for NFC communications of claim 36, wherein the first bit rate value and the second bit rate value each include a bit rate value from among: a value indicating maintenance of a currently set bit rate, a value indicating 106 kbps, a value indicating 212 kbps, or a value indicating 424 kbps.

40. The apparatus for NFC communications of claim 36, wherein the first bit rate value is a data rate send by the initiator (DSI) value, and wherein the second bit rate value is a data rate receive to initiator (DRI) value.

* * * * *